United States Patent
Johnson et al.

(10) Patent No.: US 6,247,059 B1
(45) Date of Patent: Jun. 12, 2001

(54) TRANSACTION STATE BROADCAST METHOD USING A TWO-STAGE MULTICAST IN A MULTIPLE PROCESSOR CLUSTER

(75) Inventors: Charles S. Johnson, San Jose; Muhammad Shafiq, El Granada, both of CA (US)

(73) Assignee: Compaq Computer Company, Houston, TX (US)

( * ) Notice: Subject to any disclaimer, the term of this patent is extended or adjusted under 35 U.S.C. 154(b) by 0 days.

(21) Appl. No.: 09/149,751

(22) Filed: Sep. 8, 1998

Related U.S. Application Data

(60) Provisional application No. 60/060,418, filed on Sep. 30, 1997.

(51) Int. Cl.[7] .......................... G06F 15/16; G06F 15/173; H04L 12/56; H03K 19/003
(52) U.S. Cl. .......................... 709/237; 709/238; 709/248; 370/390; 370/469; 714/18; 714/48
(58) Field of Search .................. 709/248, 238, 709/228, 237; 370/390, 408, 432, 469; 714/18, 47, 48

(56) References Cited

U.S. PATENT DOCUMENTS

| | | | |
|---|---|---|---|
| 4,617,657 | * 10/1986 | Drynan et al. ...................... | 370/394 |
| 5,459,725 | 10/1995 | Bodner et al. ...................... | 370/60 |
| 5,602,839 | 2/1997 | Annapareddy et al. ............... | 370/54 |
| 5,604,487 | * 2/1997 | Frymier ........................... | 340/825.07 |
| 5,905,871 | * 5/1999 | Buskens et al. .................... | 709/245 |
| 6,092,220 | * 7/2000 | Palmer et al. ...................... | 714/43 |

OTHER PUBLICATIONS

Braudes et al., Requirements for Multicasts Protocols, RFC 1458, May 1993, sections 3.4, 4.2.2.–3.*

Patent Cooperation Treaty (PCT) International Search Report.

The Data Link Layer, Chapter 3, p. 202 (XP–002108581).

Routing Algorithm Issues, Chapter 9, p. 205 (XP–002108582).

* cited by examiner

Primary Examiner—Mark H. Rinehart
Assistant Examiner—Paul Kang
(74) Attorney, Agent, or Firm—Leah Sherry; Justin Boyce; Oppenheimer Wolff & Donnelly LLP

(57) ABSTRACT

In a multiple processing system comprising multiple communicatively interconnected nodes, each node having one or more processor units, multicast messages sent by a sender node will contain information that allows intended receiver nodes to check and determine the possibility that earlier-sent multicast messages from the sender node were not received by the receiver node.

5 Claims, 4 Drawing Sheets

TRANSACTION STATE BROADCAST METHOD USING A TWO-STAGE MULTICAST IN A MULTIPLE PROCESSOR CLUSTER

CROSS REFERENCE TO EARLIER APPLICATIONS

Reference is made and priority claimed to U.S. provisional patent application No. 60/060,418, filed on Sep. 30, 1997.

BACKGROUND OF THE INVENTION

The present invention relates generally to a computing system using clustering principles, and more particularly to transmission of multicast (i.e., broadcast) messages to members of the system.

Many segments of today's financial and business communities (e.g., stock exchanges, banks, telecommunications companies) require computing environments that are fault tolerant and provide high availability. Downtime in these environments can be extremely costly and are not lightly tolerated. There exists a number of different approaches to providing fault tolerance and high availability. However, one enjoying increasing popularity is the employment of distributed operating systems in connection with a collection of independent processing environments, referred to as nodes, to be connected via some form of a communication interconnect to form a "cluster" which can operate as a single system or as a collection of independent processing resources. High availability and improved fault tolerance are achieved by the distributed nature of the operating system. High availability is achieved by distributing the system services and providing for their failover. With this approach, the system as a whole can still function even with the loss of one or more of the nodes that make up the system.

Regardless of how such processing system clusters are used, it is often advantageous to keep each of the processing elements of such systems up-to-date as, for example, to the system's configuration (e.g., what elements are located where, etc.). This, in turn, often will require that each node possess the capability of transmitting (i.e., broadcasting) messages to the other nodes of the cluster system. Often, such "multicast" transmissions are sent point-to-point, that is, from a sender node to a first node, then to a second node, and so on until all target nodes have been addressed. This multicast transmission procedure can require considerable processing time, increase the messaging traffic on the communicating medium of the cluster (particularly when the message is intended for every node in the cluster), and impose unacceptable restraints and limitations on system performance. Some procedures will require continuing retransmission of the message when not acknowledged by the intended receiver node. The constant retransmission of the message to all non-responding nodes further increases traffic on the network thereby degrading the overall network performance as well as occupying processor time and other cluster resources.

More importantly, however, is the need to identify the failure to receive a message, i.e., for the intended receiver to determine in some way that a message was sent, but not received. For example, if a sender node and multiple receiver nodes are interconnected by a routing network, it is not unexpected that messages can get lost and not arrive at one or more of the intended receivers (in the case of multicast transmissions). Thus, if the sender node transmits a multicast message that is received by some, but not all, of the intended receivers, those receivers that did not receive the message may well be missing needed information that can inhibit or impede system operation or proper operation of other nodes of the system.

It can be seen, therefore, that there is a need for a more efficient method of multicast transmission in a multiple processor or cluster system that also checks for and supplies possible missing multicast messages.

SUMMARY OF THE INVENTION

The present invention provides a prompt and efficient method of transmitting a multicast message in a multiple processor cluster. In addition, the method provides a technique for sequenced once only delivery of messages supplemented by the ability to supply missing earlier-sent messages to multiple receivers.

The invention finds particular advantage in a multiple processor system is arranged as a cluster of nodes. Each node comprises one or more processor units, although those skilled in this art will readily see that the invention will also find effective use in other multiple processor arrangements. According to the invention, a sender node will initiate a multicast message transmission by inserting, in a destination address field of the message, an address indicative of the message being a multicast transmission. The multicast message is also structured to include a sequence number and a "date of birth" (DOB) marker (a monotonically incrementing value that is indicative of when a node is brought on-line, i.e., comes to life). All nodes communicatively connected to the sender node will, therefore, receive the multicast message, and acknowledge that receipt with a responsive acknowledgement (ACK) message addressed to the sender node (as identified in the multicast message). A failure by the sender node to receive an ACK message from any of the nodes for whom the multicast message was intended within an allotted time period will prompt the sender to assume that the non-responding receiver node(s) did not, for whatever reason, receive the multicast message, and to begin sending point-to-point messages to such nodes. Point-to-point messages will continue to be sent until a responsive ACK is received, or the non-responsive node is declared by the system to be inoperative.

When a multicast message is received, the receiver node will check the sequence number contained in the message. If the sequence number is out of sequence, the receiver node will queue the message in an ordered queue and then check the queue for the missing least sequence number message, and send a negative acknowledgement for the multicast message corresponding to such missing least sequence number. On the other hand, if the sequence number or the DOB marker contained in the multicast message do not match the sequence number or marker expected by the receiver node, a resynchronization request message will be returned by the receiver node to the sender node. The resynchronization request will cause the sender node to respond with its new marker, and the sequence number of the last multicast message unacknowledged by the receiving node. In this way, lost multicast messages can be accounted for and delivered.

In a further embodiment of the invention, if a receiver node repeatedly fails to respond to multicast messages, but does respond to point-to-point messages, the sender node will make note of that fact, and all future multicast messages will be accompanied by a point-to-point message to that particular receiver node—until it finally responds to a multicast message.

The invention is disclosed in connection with use of the User Data Protocol (UDP) of the TCP/IP protocol suite to transfer information (messages) between the nodes of the system, including the multicast messages. A multicast message will typically consist of a number of UDP datagrams. Each datagram is provided a sequence number that identifies the location of the datagram in the sequence. Further, subsequent messages as well as prior messages have sequence numbers that identify not only the datagrams with a sequence of a message, but also relative to the other sequences. When a receiving node receives a datagram A further understanding of the nature and advantages of the inventions herein may be realized by reference to the remaining portions of the specification and the attached drawings.

DESCRIPTION OF THE PREFERRED EMBODIMENT

Figure 1:
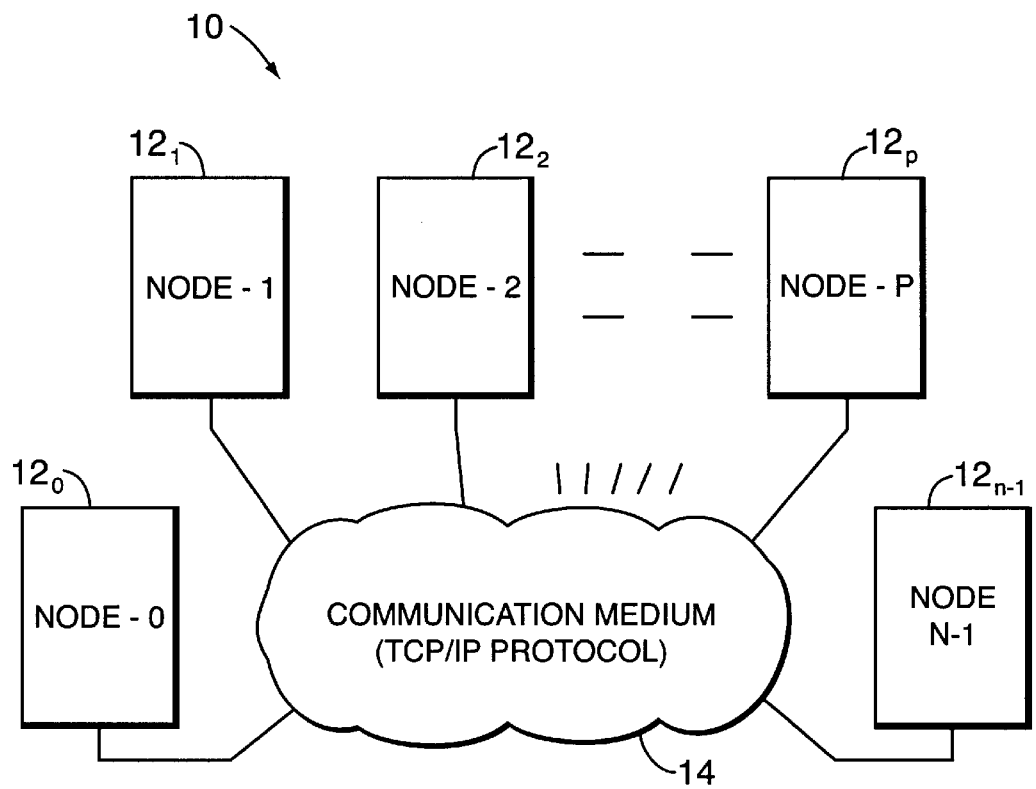
FIG. 1 is a simplified representation of a multiple processing system, comprising a number (N) of communicatively interconnected processor nodes, for utilizing the multicast transmission method present invention.
Figure 2:
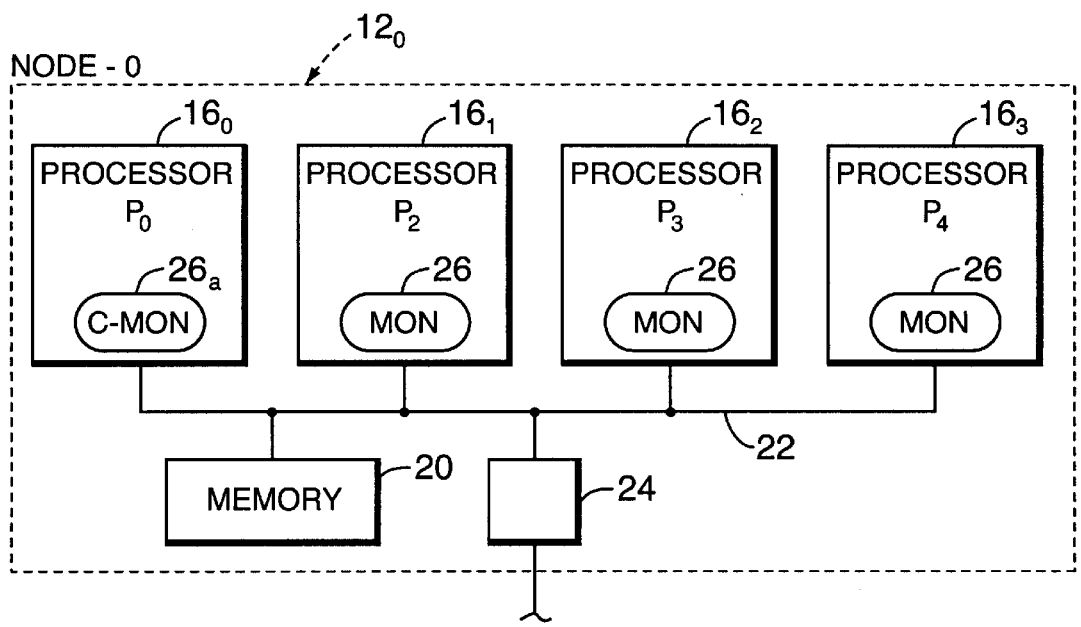
FIG. 2 is a schematic illustration of a multiple processor node of FIG. 1.

Turning now to the FIGS., and for the moment with specific reference to FIG. 1, there is illustrated a multiple processing system or "cluster" 10 comprising a number of nodes 12 ($12_0$, $12_1$, . . ., $12_{n-1}$, where n can be as high as 129)—or greater, or less, depending upon the design and implementation—interconnected by a communication medium 14. Each of the nodes 12 will comprise one, or preferably more (up to 8 for reasons that will be explained below) processor units such as illustrated in FIG. 2 where node $12_0$ is shown as comprising four processor units 16 ($16_0$, $16_1$, . . ., $16_3$), preferably operating under the Windows NT operating system (Windows, NT, and Windows NT are trademarks of MicroSoft Corporation, Redmond, Wash.). The NT Windows operating system implements a symmetric multiprocessing (SMP) system for each node 12 having more than one processor unit 16 exploiting the power of multiple processor units through distribution of the NT operating system. It will be evident to those skilled in this art that other operating systems can be employed for an SMP configuration. Further, in connection with the present invention, as will also be evident, the present invention does not require an SMP configuration or a distributed operating system; that is, the method of the present invention can be used in multiple processing systems using one processor unit 16 per node 12. The invention can be advantageously employed in other differently configured multiple processing systems having a need for multicast transmissions.

Although only node $12_0$ is shown in FIG. 2 as the representative node, it will be understood that the other nodes 12 of the cluster 10 (FIG. 1) are of the same basic construction as that of node $12_0$, with the exception of the number of processor units 16, as indicated above. Thus, a description of node $12_0$ should be taken as a description of the other nodes 12 unless otherwise indicated.

As FIG. 2 shows, the processors 16 are communicatively connected to one another and to a shared memory element 20 by a bus architecture 22 of conventional design. In addition, the bus 22 connects to an interface unit 24 that provides the necessary connectivity of the node $12_0$ to the communication medium 14. Resident on each of the processors 16 is a monitor (MON) process 26 which, among other things, assists in handling interprocessor communications between that processor 26 and the others. One of those monitor processes 26 is selected as a coordinator monitor (C-MON) process, here C-MON 26a, with the added responsibility of assisting in handling internode communication—particularly multicast transmissions. Each node 12 will have one processor 16 running the C-MON process. The C-MON process 26a of any particular node will also have the responsibility of distributing messages received from the communication medium 14 to the other processors 16 of the node, including message traffic identified as being for a specific processor 16, or received multicast messages, using the NT interprocessor communication service.

Internode communication preferably uses the Internet suite. For message transmissions between one node and another (i.e., a point-to-point transmission), the TCP service may be used due to its reliability. However, point-to-point communication is not particularly suited for multicast message transmissions—particularly in systems with a large number of nodes 12 because of the tendency to absorb the resources of the sender processor 16, and to increase traffic on the communication medium. A more efficient broadcast method is to use connectionless capability of the UDP service which lends itself quite well to multicast transmissions. For multicast transmissions, therefore, the UDP service is preferred because of its adaptability of the connectionless protocol form to multicast transmissions. The inherent unreliability of a connectionless protocol is accounted for by providing a method of determining at the multicast receiving end whether prior multicast message packets were sent but not received by certain of the intended receiver nodes. Thus, any possible degradation in reliability is overcome by the present invention with the incorporations of several safeguards that ensure multicast messages are received by all nodes 16 concerned in a manner that will be described more fully below.

Figure 3:
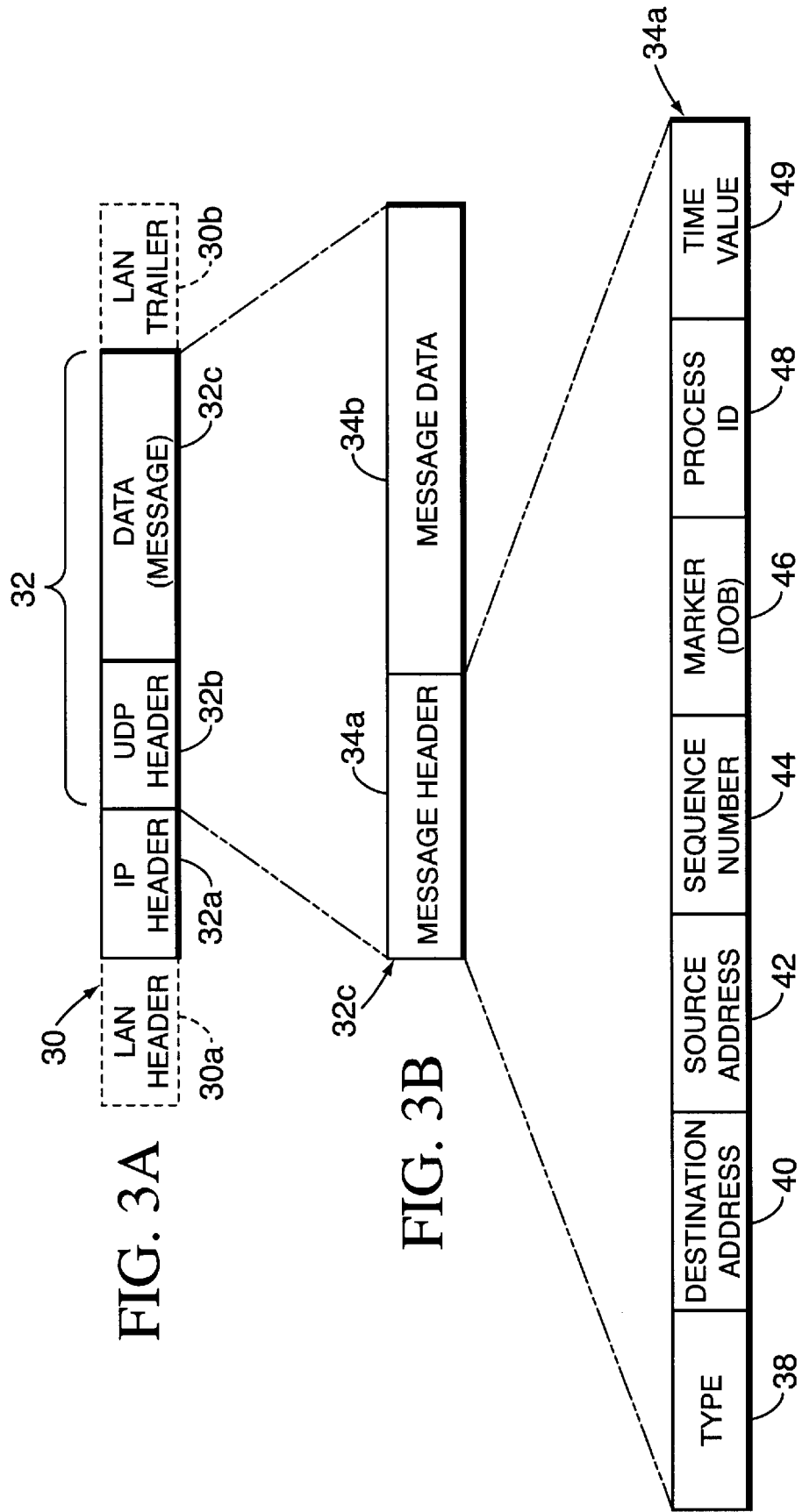
FIG. 3A illustrates a multicast message structure showing encapsulation of a message packet used in the present invention in a TCP(UDP)/IP packet which, in turn, may be encapsulated in a local area network (LAN) packet.
FIG. 3B illustrates encapsulation of the message packet used by the present invention in the UDP datagram packet that, in turn, is encapsulated in the message structure shown in FIG. 3A.
FIG. 3C illustrates the fields of the message packet used by the present invention.

Referring now to FIGS. 3A–3C, illustrated is the structure of a multicast message formed for incorporation of the present invention. It is assumed, for purposes of discussing this invention, that the communication medium 14 is structured to operate within a local area network (LAN) of one type or another (e.g., Token-Ring, FDDI, Ethernet, etc.), and that any Internet suite data packet messages will therefore be encapsulated in a LAN packet 30 as FIG. 3A illustrates. Thus, the LAN packet 30 will include an Internet packet 32, adding a LAN header 30a and LAN trailer 30b, and such other information as may be needed by the particular protocol of the LAN. The Internet packet 32, in turn, will comprise a conventional IP header 32a (which will identify the node 12 to which the message is directed), UDP header 326 (in the case of a multicast transmission), and the UDP data area 32c. It is the UDP data area 32c that contains the message packet being transmitted.

The UDP data area 32c is illustrated in greater detail in FIG. 3B, and is shown as including a message header 34a and a data portion 34b. FIG. 3C illustrates in greater detail the fields of the message header 34a, including a type field 38, identifying the message type (e.g., whether a multicast, acknowledgement, negative acknowledgement, etc., message); a destination address field 40 operates to identify the processor 16 of the system 10 (FIG. 1) to which the message packet 36 is directed. If the message packet is a multicast transmission, the IP address and destination address fields are set to a specific value (e.g., minus 1) to identify the message as a multicast transmission.

Continuing with FIG. 3C, the message header 34a further includes a source address field 42 to identify the processor unit 16 sending the message, and a 32-bit sequence number field 44. The MON, C-MON processes 26, 26a of the processor units 16 each maintain a table of sequence numbers, one for each of the other processor units 16 of the system 10. When ever one of the processors 16 sends (point-to-point) a message packet to another processor 16, the MON process of the sending processor will check the table corresponding to the receiver processor for the next sequence number to use, increment that number by one and insert that sequence number in the message packet. The incremented sequence number is returned to the table to replace the prior (unincremented) sequence number.

In addition, the C-MON process 26a of each node 12 maintains a table that will have one extra entry: a sequence number for multicast transmissions. When a message is being developed for multicast transmission, the table is accessed for the sequence number pertaining to multicast transmissions and, as described above, incremented by one, returned to the table as incremented. The incremented sequence number is placed in the sequence number field 44 of the message packet.

Continuing, the message header 34a is shown as also having a DOB marker field 46. The content of the marker field 46 is indicative of a relative point in time when the sender node 12 came on-line in the system 10, and therefore serves as a kind of "date of birth" for the node. The DOB marker is a monotonically incremented value that is used by each node as a relative birth date. The sequence number and DOB marker (hereinafter, just "marker") of a multicast message are used as a safeguard, as will be seen, against a node 12 failing to receive one or more multicast messages and not knowing that it is missing such message(s).

Finally, the message header 34a includes a process identification (ID) field 48 and a Time Value field 49. The content of process ID field 48 identifies the particular process operating on the sending processor unit 16 (as identified by the content of the destination address field 42) that initiated the multicast transmission. The Time Value field 49 carries what is basically a time stamp that, among other things, allows a sender to develop a run time round-trip interval value. For example, each message transmitted by a sender node 12 will have a time value indicative of the (local) time of the sender node. The receiver node 12 will typically respond with at least an acknowledgement message that will include, in the Time Value field 49 of the response, the time stamp that was carried by the received message. When the sender node 12 receives back the acknowledgement (or whatever other response), it uses the time stamp value carried in the Time Value field 49 of the acknowledgement or response to determine the run time round-trip interval between the sender and receiver nodes 12 merely subtracting the received time value from the present time value maintained by the sender node 12.

Figure 4:
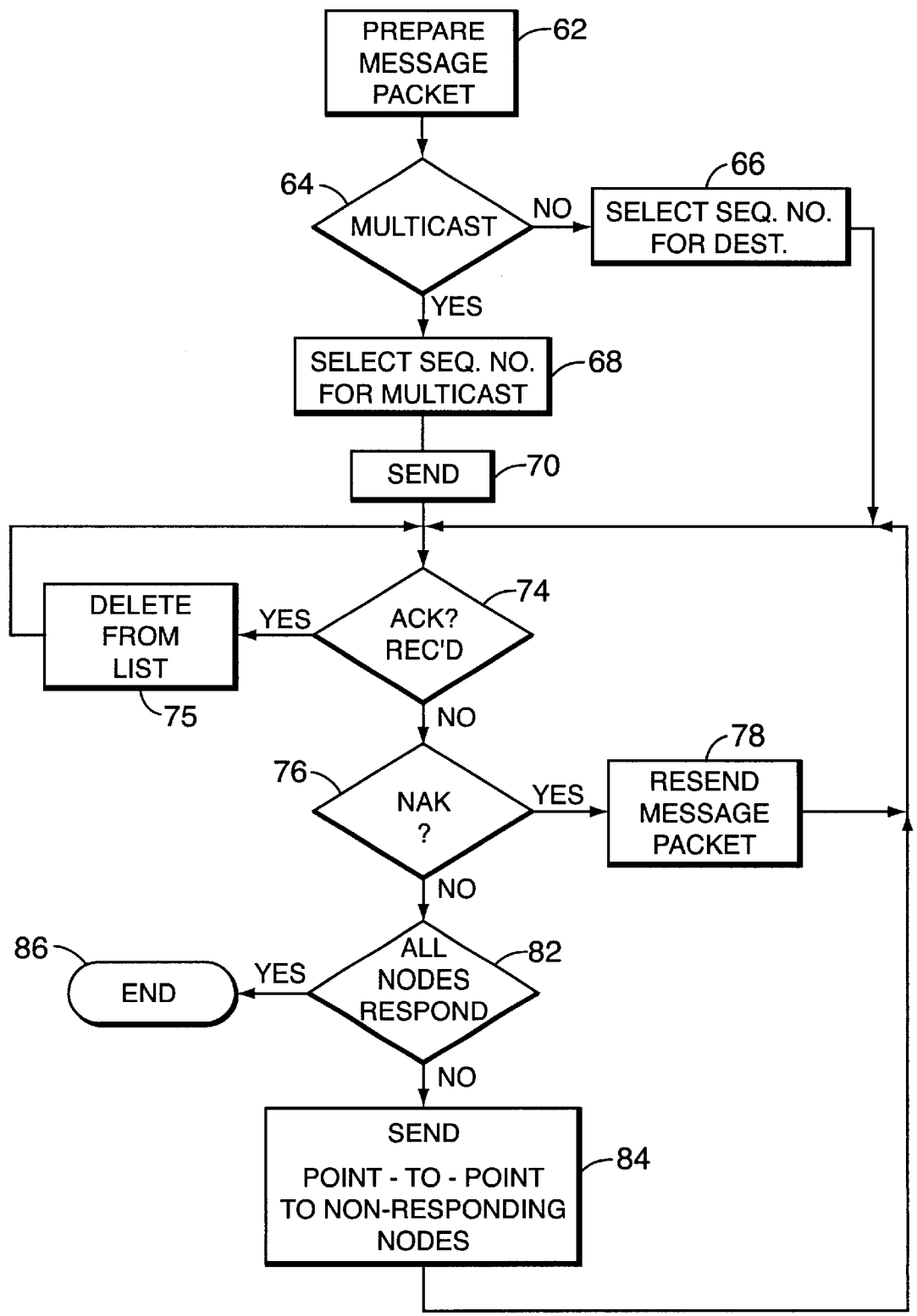
FIG. 4 is a flow diagram generally illustrating the steps taken in connection with a multicast message transmission by a (multicast message) sender node of the system shown in FIG. 1.
Figure 5:
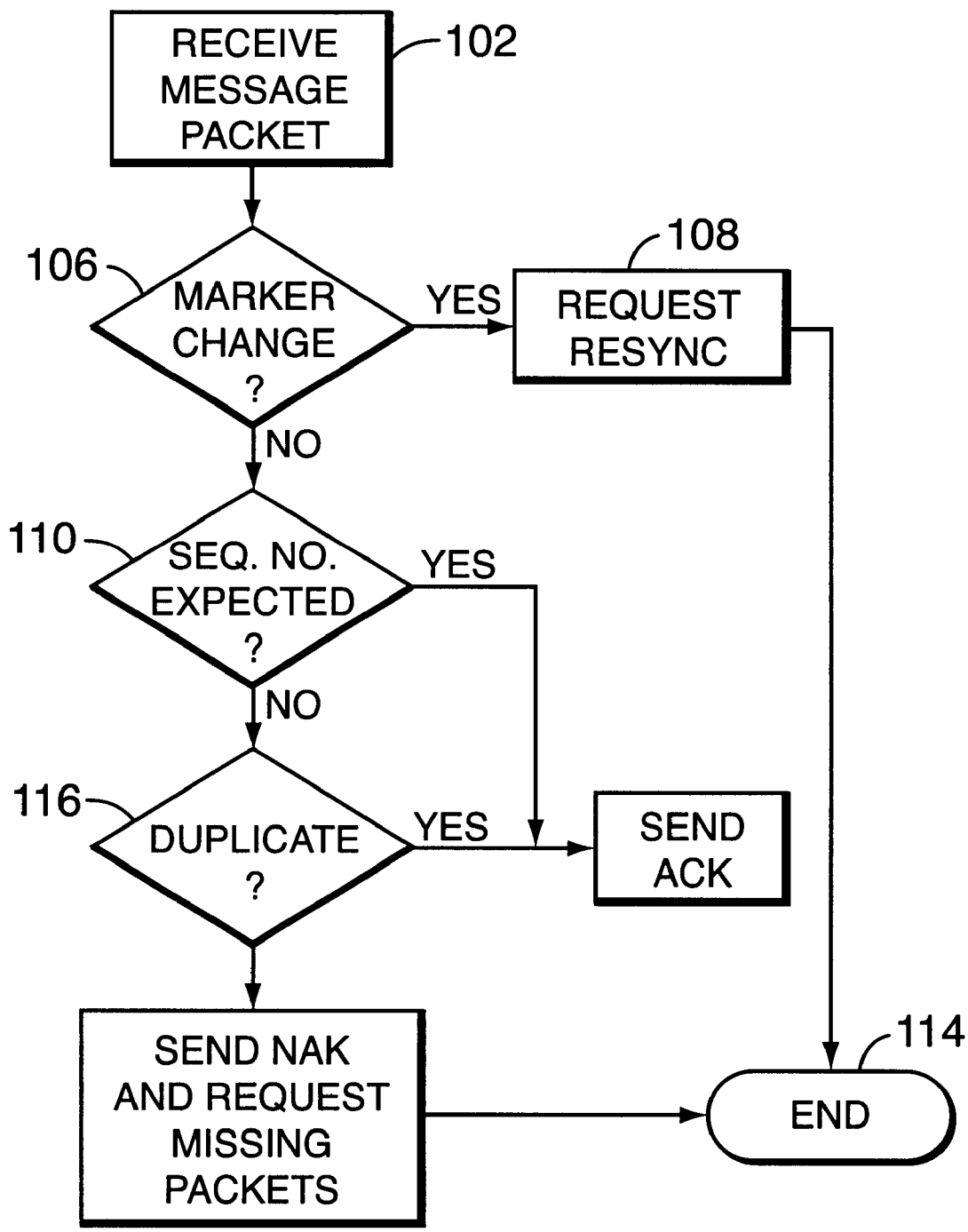
FIG. 5 is a flow diagram illustrating the steps taken by a receiver node when receiving a multicast message transmission.

Turning now to FIGS. 4, and 5, there illustrated, in flow diagram fashion, are the major steps taken to both transmit and receive multicast message transmissions by a sender and receiver nodes 12 (more accurately, the C-MON processes 26a of the sender and receiver nodes 12). Referring first to FIG. 4, the process of sending a multicast message begins, of course, with its preparation in step 62 where such preparation will include a message header 34a to contain: a type value in the Type field 38; a destination address that identifies the message as a multicast message in destination field 40; and, a source address identifying the sender node in the source address field 42. Step 64 determines whether the message transmission is to be multicast, or a transmission to a specific processor unit 16 of the system 10. If the latter, step 66 selects for the Sequence Number field 44, the next sequence number for the intended destination processor unit 16. If a multicast message is being developed, step 68 selects for the sequence address field 44 a sequence number that is greater than the immediately prior multicast message packet sent by this node 12. The DOB marker field 46 will contain, for either transmission type, the DOB marker for this sender node 12, and the process ID field 48 will identify the intended process to receive the transmission, if any. Finally, a time stamp, indicative of the local time of transmission will be put in the Time Value field 49.

Step 70 sends the message encapsulated within an Internet packet format as the data payload, and in turn encapsulated in whatever additional packaging is needed by the protocol used for communication using the communication medium 14 (FIG. 1). Thus, the Internet packet may be encapsulated in a LAN packet—as illustrated in FIG. 3A. The sender node 12 (i.e., the C-MON process 26a of that node) will then set a timer and move to step 74 where it will wait for receipt of acknowledgements (ACKs) (not shown), from each intended receiver node 12 confirming receipt of the multicast transmission, or non-acknowledgements (NAK) that, in effect, request a point-to-point re-transmission of the message.

The sender C-MON process 26a will maintain a log of the receiver nodes intended to receive the multicast message. As the sender C-MON process 26a is notified of the proper receipt the multicast transmission by an ACK, it will remove the acknowledging sender node identification from the log.

Digressing for the moment, ACK and NAK messages are of the same basic form shown in FIGS. 3A–3C. The destination address field 40 will identify the multicast sender node 12, the source address field 42 will identify the multicast receiver node sending the ACK or NAK, and the sequence number field 44 will carry the sequence number of the multicast message that the ACK or NAK message is responding to, and the marker field 46 carries the marker of the receiver node 12 sending the ACK or NAK message.

If an ACK message is received (step 74) from one of the intended receiver nodes 12, the multicast send procedure will move to step 75, where the identification of the receiving node sending the ACK (as contained in the source field 42 of the ACK message) is deleted from a list of nodes from which the multicast sender node is awaiting acknowledgement, and the procedure returns to await any remaining ACKs. On the other hand, if a NAK message is received (step 76), the sender node determines from the received NAK message which multicast message is requested by the receiver node sending the NAK, and send it as a point-to-point message transmission. The procedure then returns to await the acknowledgement of the just sent message and any others still outstanding from earlier sent multicast messages.

The timer (not shown) that is set in the multicast message send step 70 will eventually time out, if all the intended receiving nodes of a multicast transmission have not acknowledged the transmission within the determined run time computed round-trip interval. Thereafter, the multicast sender node 12 will begin resending the multicast message point-to-point, to those nodes not yet providing ACK or NAK messages (steps 82–84), and continue doing so until the sender node 12 receives an ACK message from all the nodes or the non-respond node(s) 12 is declared to have been removed from the system (step 82). When all nodes have responded (or those that haven't are declared to no longer be in the system) the multicast transmission will considered to be concluded (step 86).

FIG. 5 broadly outlines the procedure that takes place at a receiver node 12 when receiving a multicast message, beginning with the receipt of the multicast message in step 102 by the C-MON 26a of the receiving node. Each receiver node 12 will maintain a queue, one queue for each node of the system 10, of all received multicast messages from each of the other nodes 12. when a multicast message is received, it is placed on the queue for the sender node (as identified by the Source Address field 42 of the message). Later, the message will be examined, in step 104, to determine first if the DOB marker of sender node included in the message (Marker field 46) is different from a DOB maker received via previous multicast messages from this particular sender node. (If this is the first marker from this sender, the receiving node, i.e., the C-MON process 26a, will store the marker for this sender.) If there is a difference, the receiver node will, in step 108, prepare a resynchronization message that is sent to the multicast sender node, requesting a resynchronization.

A resynchronization request by a receiver node will be responded to by the multicast sender node with the sequence number of the earliest unacknowledged multicast message sent by that sender node. The receiver node, when receiving the resynchronization response, will check its queue for multicast messages from that sender node that are missing, as indicated by missing sequence numbers between that contained in the resynchronization response message and the most recently received multicast message. The receiver node will then send a negative acknowledgement (NAK) for each missing multicast message (if a NAK message has not been sent within a run time round-trip interval earlier).

If the DOB marker contained in the received multicast message matches that expected by the receiver node, the receiver node 12 will, at step 110, check the sequence number to ensure that the sequence number is as expected, i.e., that it is next in the sequence of multicast messages received from this sender node 12. If so, the receiver will send an ACK message (point-to-point) to the multicast sender node (step 112), and then conclude in step 114.

If the sequence number does not match, the receiver node 12 will check (step 116) to see if the sequence number is the same as an earlier received multicast message, i.e., is this received multicast message a duplicate of one earlier received. If so, the receiving node 12 will disregard the message, and moving to step 112 to send an ACK for the message, and concluding at step 114.

If the receiver node determines, in steps 110 and 116, that the sequence number is not as expected, and not a duplicate of an earlier received multicast message from this sender, the receiving node will then check its queue of received multicast messages for the multicast sender node to find the missing least sequence number multicast message (i.e., the earliest missing multicast message form this sender node 12). If a NAK has not been sent for this missing least sequence number multicast message within a run time computed round-trip interval, one will be sent in step 118, and the receiving node will move to the conclusion step to await response in the form of the requested message.

As indicated above, multicast messages received by a receiver node are placed in an ordered queue. The C-MON process 26a will check the queue, and all available messages up to the last or missing multicast message will be delivered to the other MON process 26 of that node via the NT interprocessor communication service.

In summary, there has been disclosed a multicast method for a TCP/IP based network in which all multicast packets are sent as UDP datagrams using a pre-configured broadcast IP address. These datagrams are received on a broadcast IP port by the Coordinator monitor (C-MON) process who will relay these datagrams to other monitor (MON) processes executing in different processor units of the same node. An acknowledgment is sent using a UDP datagram to the sender. If an acknowledgment is not received within a run-time computed retry interval, the sender will keep retrying a point-to-point UDP datagram until the remote end (receiver) is declared dead by the cluster manager. Once all alive remote ends acknowledge the packet, the sender is notified for successful delivery of the multicast.

A multicast coordinator is a MON process whose UDP port is designated as the broadcast port. This selection is made through the Windows NT registry. If no MON is designated as a multicast coordinator then the first MON process with respect to NT registry configuration is designated as multicast coordinator.

A multicast packet is sent on a broadcast port of pre-configured broadcast IP address. Since a TCP/IP based network may have been configured to limit the broadcast within a subnet, the broadcast on TCP/IP network may not get delivered to all the nodes participating in a cluster. The sender waits for the acknowledgment from all the nodes of the cluster. If an acknowledgment is not received within a run-time computed retry interval, a point-to-point UDP datagram is sent to non-responding Coordinator MON. The sender keeps on retrying using exponentially incrementing retry interval until an acknowledgment is received from the target node or the target is declared dead. Since the target IP port for the target node may be configured to receive non-multicast packets, the header of a multicast packet is set to indicate a multicast packet.

Once a multicast packet is received by a coordinator MON, it is checked for duplicate or out of sequence delivery. If this is a duplicate packet a positive acknowledgment is sent to the sender and no other action is taken. On the other hand if an out of sequence packet is received, the packet is queued in an ordered queue and then the queue is checked for the missing least sequence number packet. If a negative acknowledgment for the missing sequence number has not been sent within a run time computed round-trip interval then a negative acknowledgment for the required sequence number packet is sent.

Once a packet is queued in the ordered queue, the queue is checked by the receiver node Coordinator MON and all available packets up to the last expected/missing packets are delivered to other MON using Windows NT operating system's interprocessor communication mechanism.

If a positive acknowledgment is received by the sender then all packets waiting for the acknowledgment up to the sequence number as indicated by the positive acknowledgment are assumed to be acknowledged from the remote end. The sender checks the list of nodes that should have acknowledged this multicast. If all the nodes have acknowledged this packet then multicast is declared completed.

Each multicast packet carries a sequence number and a monotonically incrementing marker. If either sequence number or the marker do not match with the expected sequence number or the expected marker, a re-synchronize request packet is generated by the receiver and sent to the multicast sender. Upon reception of the resynchronize request packet, a re-synchronize response is sent with the new marker and last un-acknowledged multicast packet sequence number from the receiver. A re-synchronization response can be initiated when a negative acknowledgment received for a non-waiting multicast packet.

What is claimed is:

1. In a processing system including a plurality of processor nodes communicatively interconnected for communication therebetween, a method of transmitting a sequence of multicast messages from a sender one of the nodes to intended receiver ones of the processor nodes, comprising the steps of:

the sender node sending a sequence of multicast messages to a plurality of intended receiver nodes, each multicast message including message data and a marker indicative of a time of life of the sender node;

each of the intended receiver nodes performing the steps of receiving at least one of the sequence of multicast messages, comparing the time of life indicated by the marker to the time of life indicated by a prior-received marker, and sending a resynchronization message to the sender node if the time of life indicated by the marker and the time of life indicated by the prior-received marker do not compare;

the sender node receiving a resynchronization message from a receiving one of the intended receiver nodes;

the sender node determining at least one prior unacknowledged one of the sequence of multicast messages that has been sent to the receiving node and for which no acknowledgement message has been received from the receiving node; and the sender node sending at least one point to point message including the message data associated with an unacknowledged multicast message that has been previously sent to the receiving node.

2. A method for multicast transmission of a message from a sender node to a plurality of processing nodes in a multiple processor system, the method including the steps of:

transmitting a sequence including a plurality of multicast messages from the sender node for receipt by a plurality of intended receiver nodes, each multicast message including associated message data, an associated sequence number indicative of a position of the multicast message within the sequence, and an associated marker indicative of a life of operation of the sender node, each of the intended receiver nodes being operative to send to the sender node an acknowledgement message indicating receipt of each multicast message received at the intended receiver node, to compare each of the markers received via the multicast messages to prior-received markers, to send a resynchronization message to the sender node if a marker and a prior-received marker do not compare, to check the sequence number of each received multicast message to determine whether there is a missing one of the sequence of messages that has been previously sent by the sender node and not received by the intended receiver node, and if there is a missing message, being further operative to send to the sender node a non-acknowledgement message identifying the missing message;

upon receipt at the sender node of a non-acknowledgement message from a particular one of the intended receiver nodes, sending a point to point message to the particular node, the point to point message carrying the message data associated with the missing multicast message;

for each of the intended receiver nodes, determining whether an acknowledgement message or a non-acknowledgement message is received from the associated intended receiver node for each of the transmitted multicast messages during an associated predetermined time interval, and determining non-responding ones of the intended receiver nodes from which no acknowledgement message or non-acknowledgement has been received for the associated multicast message during said associated time interval; and sending a point to point message to each one of the non-responding nodes, each point to point message carrying message data associated with a multicast message for which no acknowledgement or non-acknowledgement message has been received after said predetermined time interval has elapsed;

receiving a resynchronization request message from a receiving one of the intended receiver nodes;

developing a resynchronization response message in response to the request message, the response message indicating an earliest sequence number of an earliest sent unacknowledged one of the sequence of multicast messages that has been sent to the receiving node and for which no acknowledgement message or non-acknowledgement message has been received from the receiving node; and sending the resynchronization response message to the receiving node, the receiver node being operative to determine missing multicast messages by comparing the earliest sequence number and the sequence number of a most recently received multicast message, and being further operative to send to the sender node at least one non-acknowledgement message identifying one of the missing messages.

3. The method of claim 2, wherein each of the multicast messages further includes a time stamp indicative of the local time of transmission at the sender node, and wherein each acknowledgment message sent by a particular receiver node and indicating receipt of an associated one of the multicasts messages includes the time stamp carried by the associated multicast message, and wherein the predetermined time interval associated with the particular intended receiver node is a calculated specific run-time interval determined based on a prior received time stamp carried by a prior received acknowledgement message sent from the particular receiver node to the sender node to acknowledge receipt of a previously sent message.

4. The method of claim 2 wherein the step of sending a point to point message to each of the non-responding nodes includes re-sending the point to point message to each associated one of the non-responding nodes until an acknowledgement is received from the associated node or until the associated node is declared to be removed from the system.

5. The method of claim 4, wherein the step of re-sending the point to point message includes re-sending the point to point message in exponentially incrementing time intervals.

* * * * *

UNITED STATES PATENT AND TRADEMARK OFFICE
CERTIFICATE OF CORRECTION

PATENT NO. : 6,247,059 B1
DATED : June 12, 2001
INVENTOR(S) : Charles S. Johnson et al.

It is certified that error appears in the above-identified patent and that said Letters Patent is hereby corrected as shown below:

Title page,
Item [54], the Title reads: "TRANSACTION STATE BROADCAST METHOD USING A TWO-STAGE MULTICAST IN A MULTIPLE PROCESSOR CLUSTER"; it should read -- TRANSACTION STATE BROADCAST METHOD USING A TWO-STAGE MULTICAST IN A MULTIPLE PROCESSOR CLUSTER HAVING A SENDER TIME OF LIFE MARKER USED BY RECEIVER TO REQUEST RESYNCHRONIZATION -- ;
Item [73] reads: "[73] Assignee: Compaq Computer Company, Houston, TX (US)"; it should read -- [73] Assignee: Compaq Computer Corporation, Houston, TX (US) --

Signed and Sealed this

Eleventh Day of June, 2002

Attest:

Attesting Officer

JAMES E. ROGAN
*Director of the United States Patent and Trademark Office*